United States Patent
Cantele et al.

(10) Patent No.: US 8,661,672 B2
(45) Date of Patent: Mar. 4, 2014

(54) METHOD FOR MANUFACTURING A MOTOR VEHICLE EXHAUST GAS PURIFYING MEMBER

(75) Inventors: Cyrille Cantele, Belfort (FR); Gerard Lerdung, Mathay (FR)

(73) Assignee: Faurecia Systemes D'Echappement, Nanterre (FR)

( * ) Notice: Subject to any disclaimer, the term of this patent is extended or adjusted under 35 U.S.C. 154(b) by 266 days.

(21) Appl. No.: 13/260,782

(22) PCT Filed: Apr. 2, 2010

(86) PCT No.: PCT/FR2010/050645
§ 371 (c)(1),
(2), (4) Date: Nov. 30, 2011

(87) PCT Pub. No.: WO2010/112790
PCT Pub. Date: Oct. 7, 2010

(65) Prior Publication Data
US 2012/0110850 A1    May 10, 2012

Related U.S. Application Data

(60) Provisional application No. 61/227,183, filed on Jul. 21, 2009.

(30) Foreign Application Priority Data

Apr. 2, 2009   (FR) ...................................... 09 52134

(51) Int. Cl.
*B21D 51/16*   (2006.01)
(52) U.S. Cl.
USPC .............................. 29/890; 422/179; 422/180

(58) Field of Classification Search
USPC ...................................... 29/428; 422/179, 180
See application file for complete search history.

(56) References Cited

U.S. PATENT DOCUMENTS

| | | | |
|---|---|---|---|
| 6,389,693 B1 | 5/2002 | Aranda | |
| 2003/0097752 A1* | 5/2003 | Shirk et al. ...................... | 29/890 |
| 2003/0140495 A1* | 7/2003 | Hardesty et al. ................ | 29/890 |
| 2006/0272153 A1 | 12/2006 | Bowman | |

FOREIGN PATENT DOCUMENTS

| | | |
|---|---|---|
| EP | 1739290 A | 1/2007 |
| WO | 99/46028 A | 9/1999 |

OTHER PUBLICATIONS

International Search Report, dated Aug. 18, 2010.

* cited by examiner

*Primary Examiner* — Alexander P Taousakis
(74) *Attorney, Agent, or Firm* — Carlson, Gaskey & Olds, PC

(57) ABSTRACT

An exhaust gas purifying member comprises a housing an exhaust gas purification block placed in the housing, and an exhaust gas purification block-retaining element inserted in an annular space between the housing and the block. The retaining element is, during manufacture of the member, made from a material including at least one nonfunctional component intended to disappear after a characteristic period of using the member. A method of manufacturing the member comprises assembling the housing, the retaining element, and the exhaust gas purification block to obtain a housing whereof a diameter is equal to a predetermined diameter, and with the installation density of the retaining element being equal to a target installation density after the characteristic usage period of the member.

10 Claims, 3 Drawing Sheets

METHOD FOR MANUFACTURING A MOTOR VEHICLE EXHAUST GAS PURIFYING MEMBER

RELATED APPLICATION

This application is the U.S. national phase of PCT/FR2010/050645, filed Apr. 2, 2010, which claims priority to FR 09 52134, filed Apr. 2, 2009, and FR 61/227183, filed Jul. 21, 2009, and U.S. 61/227183, filed Jul. 21, 2009.

TECHNICAL FIELD

The present invention generally relates to methods for manufacturing motor vehicle exhaust gas purifying members.

More specifically, the invention relates to a method for manufacturing a motor vehicle exhaust gas purifying member comprising a substantially cylindrical housing defining an exhaust gas channel, a substantially cylindrical exhaust gas purification block placed in the housing, and an exhaust gas purification block-retaining element, the exhaust gas purification block having a side wall facing the housing and defining an annular space with said housing, said retaining element being inserted in the annular space between the housing and the side wall of the exhaust gas purification block.

BACKGROUND OF THE INVENTION

U.S. Pat. No. 6,389,693 describes a manufacturing method comprising a step for measuring the diameter of the gas purification block, a step for measuring the mass of the retaining element, and a step for calculating the diameter of the housing as a function of the measurements done.

In certain purification members obtained using said method, one sees, in particular after a usage period of the purification member, that the exhaust gas purification block is no longer correctly retained inside the housing.

The invention aims to offset the aforementioned problem.

SUMMARY OF THE INVENTION

A method for manufacturing a purification member includes a retaining element that is, during manufacture of said member, made from a material including at least one so-called "nonfunctional component" intended to disappear after a characteristic period of using said member. The method comprises the following steps:

acquiring a first magnitude representative of a mass Mn of the retaining element;

acquiring a second magnitude representative of a composition Cn of the nonfunctional component of said retaining element;

determining, from the first and second acquired magnitudes, an equivalent mass Mn' corresponding to the mass of said retaining element after said characteristic period of use of said member;

assessing a volume V on the basis of the equivalent mass and an installation density for said element in an annular space defined between an exhaust gas purification block and a housing;

determining a diameter of the housing on the basis of an outer diameter of the exhaust gas purification block and the volume;

assembling the housing, said retaining element, and the exhaust gas purification block to obtain a housing whereof a diameter is equal to the predetermined diameter, the installation density of the retaining element being equal to the target installation density after said characteristic usage period of said member.

According to other particular embodiments of the invention, the method includes one or more of the following features, considered alone or according to all technically possible combinations:

the acquisition of the second magnitude representative of a composition of the nonfunctional component of said retaining element comprises:

measuring a characteristic electrical magnitude of said retaining element;

determining the composition from the measured value of said electrical magnitude;

the composition of the nonfunctional component of said retaining element during the installation is determined from the measured value of said electrical magnitude using calibration curves;

said retaining element is a sheet, and the step for measuring said characteristic electrical magnitude of said retaining element comprises placing the sheet, along its thickness, between plates of a capacitive sensor and measuring the value of the capacity of the capacitive sensor for a predetermined voltage applied to said plates;

the method also includes a step for acquiring a third magnitude representative of a mass of the exhaust gas purification block, and a step for determining, from the third acquired magnitude, said target installation density;

said target installation density comprises calculating, from the third acquired magnitude, a maximum reference force applied to the gas purification block during the use of said member, then determining the target installation density from the maximum calculated reference force, preferably using a predetermined cartography;

the housing, said retaining element, and the exhaust gas purification block are assembled according to the following steps:

arranging said retaining element around the exhaust gas purification block, inserting said retaining element and the exhaust gas purification block into the housing to obtain a provisional diameter of the housing larger than the predetermined diameter and a provisional installation density for said retaining element, restricting the housing to the predetermined diameter;

the insertion step is carried out by forcibly inserting said retaining element and the exhaust gas purification block into the housing, or winding the housing around said retaining element;

the housing, said retaining element, and the exhaust gas purification block are assembled according to the following steps:

arranging said retaining element around the exhaust gas purification block, inserting said retaining element and the exhaust gas purification block into the housing to directly obtain the predetermined diameter for the housing;

the method includes an additional step comprising acquiring a fourth magnitude corresponding to the outer diameter of the exhaust gas purification block.

BRIEF DESCRIPTION OF THE DRAWINGS

Other features and advantages of the invention will emerge more clearly from the following detailed description, provided for information and completely non-limitingly, and done in reference to the appended drawings, in which.

DETAILED DESCRIPTION

Figure 1:
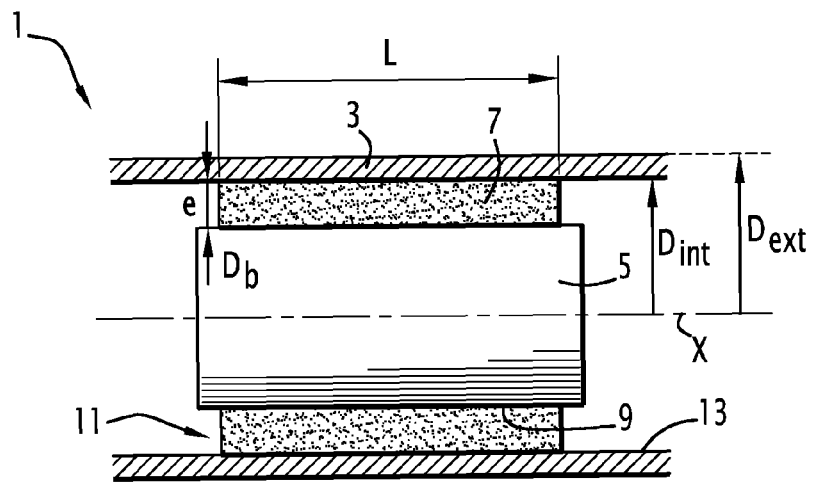
FIG. 1 is a longitudinal cross-section of a purification member manufactured according to the inventive method.

The exhaust gas purification member 1, shown in FIG. 1, is intended to be arranged in an exhaust line (not shown) of a motor vehicle. It includes a substantially cylindrical housing 3, a substantially cylindrical exhaust gas purification block 5, placed inside the housing 3, and a retaining element 7 arranged between the block 5 and the housing 3 to retain the exhaust gas purification block 5. The housing 3 and the block 5 are substantially coaxial. This shared axis is denoted X in FIG. 1.

The housing 3 is a metal housing provided to be connected, toward the upstream direction of the exhaust line, to a divergent cone defining an inlet for the exhaust gases and, in the downstream direction of the exhaust line, to a convergent cone defining an outlet for the exhaust gases. The inlet is connected to the manifold of the exhaust line, which captures the exhaust gases leaving the combustion chambers of the engine. The outlet is connected to the tube through which the exhaust gases are released into the atmosphere.

Upstream and downstream here are used relative to the normal circulation direction of the exhaust gases.

The housing 3 therefore inwardly defines an exhaust gas circulation channel. The exhaust gases circulate from the inlet to the outlet while passing through the block 5. In passing through the block 5, the exhaust gases are purified.

The block 5 is typically a catalytic purification element or a particle filter. A catalytic purification element is typically made up of a gas-permeable structure, covered with catalytic metals favoring the oxidation of the combustion gases and/or the reduction of the nitrogen oxides. A particle filter is made from a filtration material formed by a ceramic or silicon carbide monolithic structure having a sufficient porosity to allow the passage of exhaust gases. However, as known in itself, the diameter of the pores is chosen small enough to ensure retention of the particles, and in particular soot particles, on the upstream surface of the filter. The particle filter can also be made up of a cartridge filter or a sintered metal filter. Preferably, a particle filter includes a set of parallel channels, distributed in a first group of inlet channels and a second group of outlet channels. The inlet and outlet channels are arranged in staggered rows. The inlet channels open on the upstream section of the particle filter and are covered at the downstream section of the particle filter. On the contrary, the outlet channels are covered on the upstream section of the particle filter and open on its downstream section.

The block 5 has a diameter Db smaller than the diameter of the housing 3. It has a side wall 9 facing an inner wall 13 of the housing 3. The side wall 9 and the inner wall 13 define an annular space 11.

The retaining element 7 is, for example, a sheet 7 formed by an intumescent material. The sheet can be of the XPEAV2 type sold by the company UNIFRAX or, for example, of the type sold under the name NEXTEL SAFFIL or 3M, or of the type sold under the name CC-MAX or FIBERMAX by the company UNIFRAX.

The sheet 7 is made from a material including functional components, such as fibers, mica, etc., that participate in generating friction on the surface of the block 5 and the housing 3, and nonfunctional components, such as water, binders, a protective film, glue, etc. that increase the cohesion of the sheet to facilitate its handling and assembly.

Once the member 1 is manufactured, the retaining sheet 7 is arranged in the annular space 11 and extends over a length that corresponds to the majority of the length of the block 5. The sheet 7 is then compressed between the side wall 9 of the block 5 and the inner wall 13 of the housing 3. Consequently, the sheet 7 exerts pressure on the block 5. When the block 5 is subjected to a longitudinal force, the friction between the block 5 and the sheet 7, and between the sheet 7 and the housing 3 are such that the movement of the block 5 relative to the housing 3 is prohibited, or at least very limited. The sheet 7 thus constitutes a retaining element 7 for retaining the block 5 in position relative to the housing 3.

To obtain that effect, it is necessary to mount the sheet 7 in the annular space 11 with a suitable installation density. The installation density refers to the density of the sheet 7 housed in the annular space 11, at ambient temperature. This installation density must not be too low, because the block 5 would be incorrectly kept in position relative to the housing 3. The installation density must not be too high, either, to prevent damaging the block 5, in particular over the long term.

However, beyond a characteristic usage period of the purification member 1, the nonfunctional components of the material of the sheet 7 have been burned. Consequently, during the usage of the member 1, the mass of the sheet 7 first decreases, then stabilizes at a constant value beyond the characteristic usage period. Thus, the density of the sheet 7, i.e. the installation density of the sheet 7, first decreases, to then stabilize at a constant value.

The manufacturing method described below takes this evolution of the installation density into account during the usage of the member to guarantee that the installation density beyond which the characteristic usage period is equal to a target installation density d adapted to retaining the block 5.

The method includes a first phase aiming to determine the diameter, for example the inner diameter Dint, of the housing 3 of the purification member 1.

Figure 2:
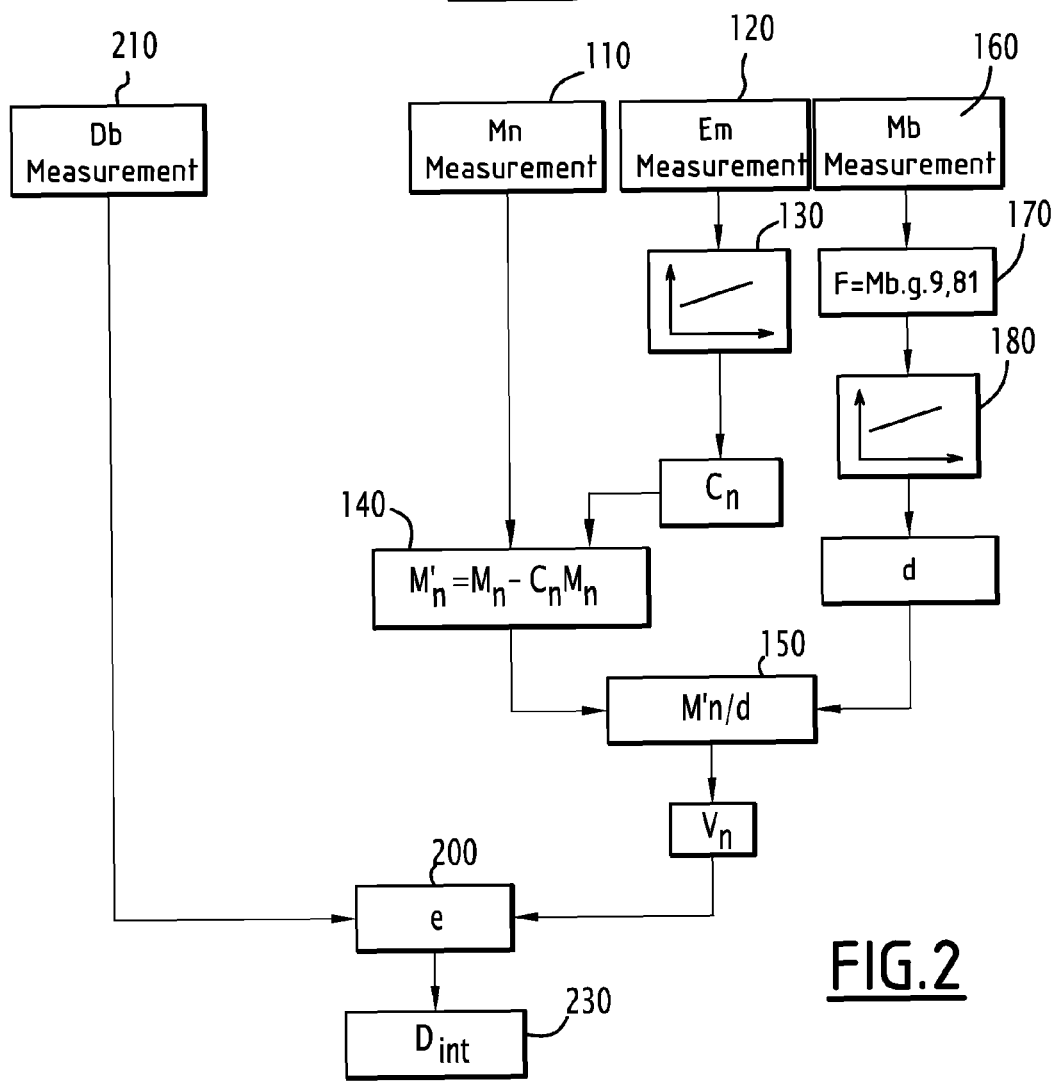
FIG. 2 is a diagram showing the steps of the inventive method making it possible to determine the diameter of the housing to be made.
Figure 3:
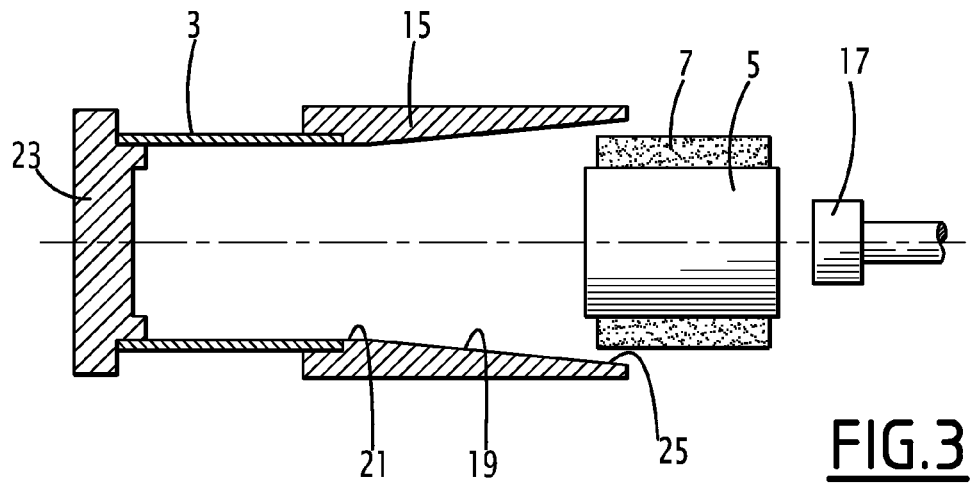
FIG. 3 is a diagrammatic view illustrating steps of the assembly of the purification member.

As shown in FIG. 2, the method includes a first set of steps making it possible to determine an equivalent mass Mn' of a sheet 7 that must be used in the manufacture of a particular member 1.

To that end, the method includes a step 110 for acquiring a magnitude corresponding to the mass Mn of the sheet 7. That mass Mn is the mass of the sheet 7 at the time of the installation. The mass Mn is, for example, directly measured using a scale.

The method according to the invention anticipates the decrease in the mass of the sheet 7 during use of the member 1 by acquiring a magnitude corresponding to the composition Cn of the sheet 7. At the very least, said composition Cn corresponds to the mass fraction of the nonfunctional components of the sheet 7 at the time of the installation.

For example, in step 120, a thickness of sheet 7 is placed between the plates of a capacitive sensor able to generate, in response to the application of a predetermined electrical voltage, a measurement En of an electrical characteristic of the sheet 7. Then, in step 130, one determines the composition Cn of the sheet 7 using calibration curves, each calibration curve being associated with a particular type of sheet. By reporting the measurement En on the calibration curve associated with the type of sheet 7 to be mounted, one determines the composition Cn of the sheet 7.

In step 140, the mass Mn of the sheet 7 is corrected to obtain the equivalent mass Mn'. To that end, the mass of the nonfunctional components given by the product Cn×Mn is deducted from the mass Mn.

In step 150, a target installation density d having been determined beforehand, the method comprises assessing a volume Vn that would make it possible to reach the target density d with the equivalent mass Mn'. The volume Vn is determined using the following formula:

$$Vn = Mn'/d$$

Preferably, the method includes a second set of steps for determining the target installation density d as a function of the characteristics of the block 5. Thus, the method includes a step 160 for acquiring a magnitude corresponding to the mass Mb of the block 5. The mass Mb is, for example, measured directly using a scale.

The method then continues with a step 170 during which a maximum reference force F is calculated corresponding to the maximum longitudinal force that the block 5 can undergo without moving relative to the housing 3. The force F can be calculated using the following empirical formula:

F=Mb×g×9.81 where g is the longitudinal acceleration applied to the block 5. A predetermined acceleration g is used to calculate F. This predetermined acceleration, for example, corresponds to the maximum acceleration that the block 5 can undergo under limit usage situations of the vehicle. These limit situations are, for example, a stopped departure with a strong acceleration, emergency braking, or an impact of the vehicle against an obstacle at moderate speed.

In step 180, one then determines the target installation density d of the sheet 7 as a function of the force F calculated above. The target installation density d is determined using predetermined cartographies. These cartographies result from tests on the vehicle on beds and/or on the road. They provide the target density d as a function of the force F for different types of sheets and different types of blocks.

In step 200, one determines the thickness e to be provided for the annular space 11 between the side wall 9 and the inner wall 13. This thickness e is calculated by dividing the volume Vn by the surface Sn of the side wall 9 of the block 5 covered by the sheet 7: Sn=L×Π×Db.

Preferably, as shown in FIG. 2, the method includes a third set of steps making it possible to determine a diameter Db for a particular block 5 needed to manufacture the member 1. Thus, in step 210, one acquires a magnitude representative of the diameter Db of the gas purification block 5. The diameter Db corresponds, for example, to the average of several measurements of the outer diameter of the block 5, done on different sections of the block 5. These sections are, for example, spaced regularly longitudinally. The magnitude Db can also correspond to the maximum of the values noted at different points of the block 5.

Lastly, the first phase of the method ends in step 230, by determining the inner diameter Dint of the housing 3 using the calculated value of the thickness e and the diameter Db of the block 5: Dint=Db+2e. Alternatively, one can choose to determine the outer diameter of the housing 3: Dext=Db+2e+2Ep where Ep is the thickness of the housing 3. Ep can be measured or can be provided by the manufacturer of the housing 3.

During a second phase of the method (the second phase being illustrated in FIGS. 3 to 7), the housing 3, the sheet 7, and the gas purification block 5 are assembled, to obtain a housing 3 whereof the inner diameter is equal to the predetermined inner diameter Dint at the end of the first phase of the method.

Figure 4:
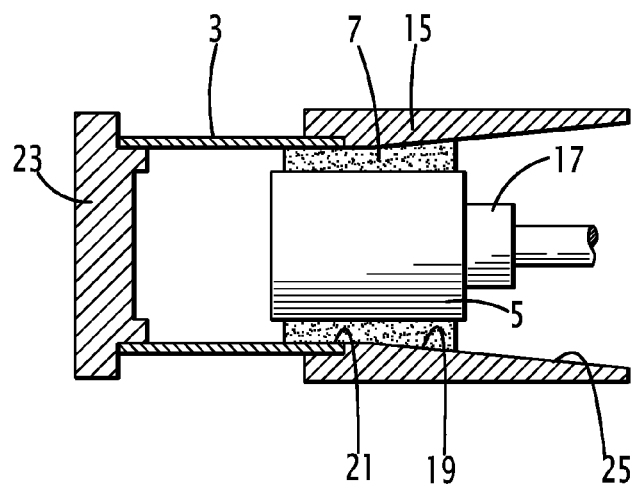
FIG. 4 is another diagrammatic view illustrating steps of the assembly of the purification member.
Figure 5:
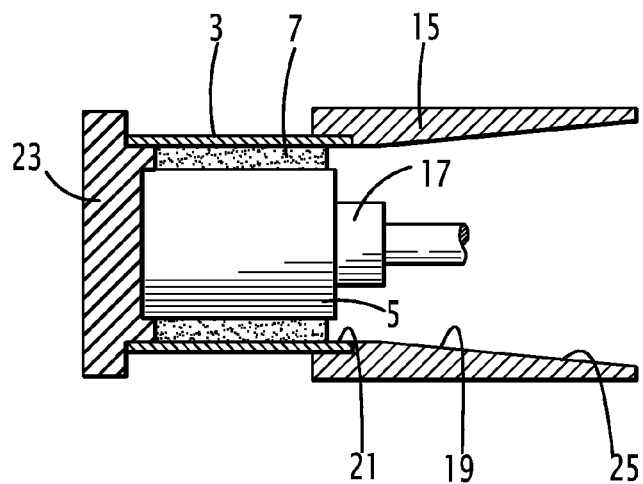
FIG. 5 is another diagrammatic view illustrating steps of the assembly of the purification member.

In a first alternative embodiment, a housing 3 with an inner diameter equal to the predetermined inner diameter Dint is supplied. The sheet 7 is first arranged around the block 5. Then, the sheet 7 and the block 5 are jointly inserted into the housing 3. For example, the sheet 7 and the block 5 are forcibly inserted into the housing 3, using a sinking 15 and a piston 17. The sinking 15 includes a substantially tapered convergent inner channel 19. The end 21 of the channel 19 with the small diameter has an inner diameter substantially equal to the inner diameter of the housing 3. The housing 3 is placed next to, and in the extension of, the end 21. It is locked relative to the sinking 15 by a stop 23. The block 5 and the sheet 7 are forced along the inner channel 19 from the end 25 with the larger diameter by the piston 17. The sheet 7 is gradually compressed as the block 5 and the sheet 7 move along the inner channel 19 and penetrate the housing 3 (FIG. 4). The piston 17 pushes the sheet 7 and the block 5 until they are completely housed inside the housing 3 (FIG. 5). For example, the stop 23 serves to limit the travel of the block 5 and the sheet 7 and to stop them in the desired position relative to the housing 3.

Lastly, the sheet 7 is compressed to an installation density greater than the target density d. But, during the use of the member 1, the installation density will gradually decrease to reach the target installation density d.

In another alternative embodiment, a housing 3 with a diameter slightly larger than the predetermined inner diameter Dint is provided. This alternative is described in U.S. Pat. No. 6,389,693.

Figure 6:
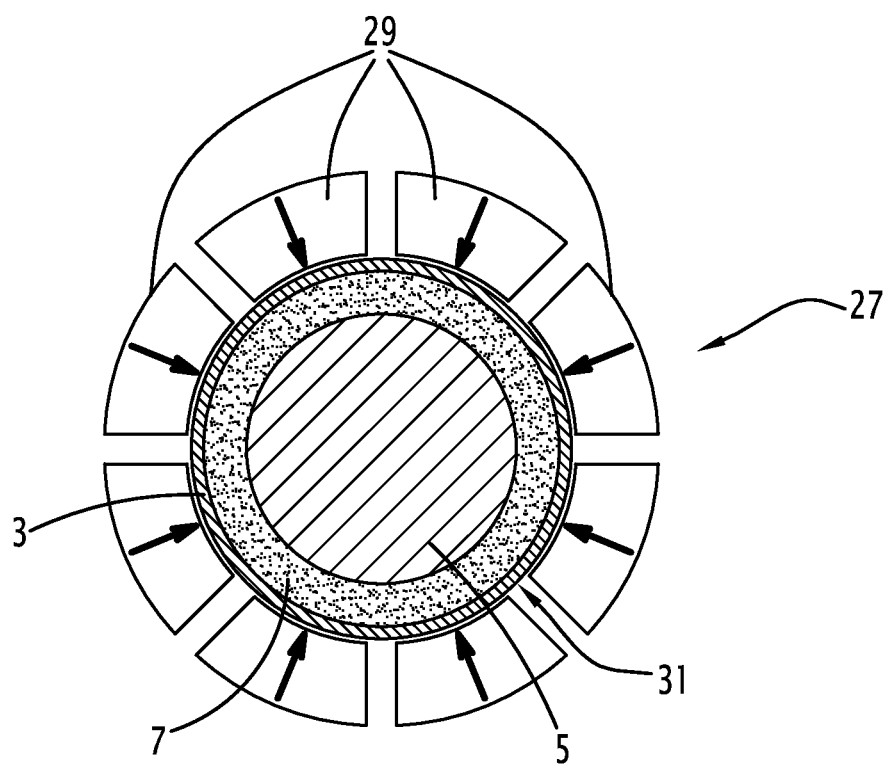
FIG. 6 is another diagrammatic view illustrating steps of the assembly of the purification member.

As before, the sheet 7 is first arranged around the block 5. Then, the sheet 7 and the block 5 are inserted into the housing 3, for example using the sinking 15 and the piston 17, following the procedure described in reference to FIGS. 3 to 5. As illustrated in FIG. 6, one then restricts the housing 3 to the predetermined inner diameter Dint. To that end, the member 1 is placed in a cylindrical compression tool 27, as illustrated in FIG. 6. The tool 27 includes a plurality of sectors 29 inwardly defining a cavity 31 in which the purification member 1 is placed. The sectors 29 are distributed circumferentially around the cavity 31. They are initially separated from each other by circumferential slits. The tool 27 is also capable of stressing the different sectors 29, in a controlled manner, radially and toward the inside of the cavity. The sectors 29 then bear on the outer wall of the housing 3 and will stress the latter until the housing 3 has a diameter equal to the predetermined inner diameter Dint.

The sheet 7 is then compressed at an installation density greater than the target installation density d. However, during the usage of the member 1, the installation density will gradually decrease to reach the target installation density d.

The method presented above has multiple advantages.

It makes it possible to more precisely manufacture the purification member. In particular, the diameter of the housing is dimensioned to anticipate the evolution of the installation density of the sheet during use of the member. The longevity thereof is improved.

For a ceramic block with a more complex shape, the method can make it possible to avoid using a seal against erosion. In fact, the erosion depends directly on the installation density of the sheet. Major erosion can be seen when the installation density is too low or too high. Better mastery of the installation density therefore makes it possible to move the system away from densities with a risk of erosion.

The method described above can have multiple alternatives.

In one non-preferred embodiment, only the composition of the sheet is measured, and a predetermined diameter is used for the block, a predetermined target installation density, and/ or a predetermined mass for the sheet.

The retaining element for the block has been described as having a single sheet 7, but, alternatively, several sheets can be used. Furthermore, the block is not necessarily retained only by one or more sheets. It can be retained by one or more seals, typically two seals placed at the two axial ends of the block. The seals can be O-rings, placed around the block in the annular space separating the block from the housing.

The sheet and the block are not necessarily inserted into the housing using a sinking. For example, the housing can be wound around the sheet.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for manufacturing a motor vehicle exhaust gas purifying member, the purifying member comprising:
    a substantially cylindrical housing defining an exhaust gas channel, a substantially cylindrical exhaust gas purification block placed in the housing, and an exhaust gas purification block-retaining element, the exhaust gas purification block having a side wall (9) facing the housing and defining an annular space with said housing, said exhaust gas purification block retaining element being inserted in the annular space between the housing and the side wall of the exhaust gas purification block, and wherein said exhaust gas purification block retaining element is, during manufacture of said exhaust gas purifying member, made from a material including at least one nonfunctional component intended to disappear after a characteristic period of using said exhaust gas purifying member, and in that the method comprises the following steps:
    acquiring a first magnitude representative of a mass of the exhaust gas purification block retaining element;
    acquiring a second magnitude representative of a composition of the nonfunctional component of said exhaust gas purification block retaining element;
    determining, from the first and second acquired magnitudes, an equivalent mass corresponding to the mass of said exhaust gas purification block retaining element after said characteristic period of use of said exhaust gas purifying member;
    assessing a volume on the basis of the equivalent mass and a target installation density for said exhaust gas purification block retaining element in the annular space;
    determining a diameter of the housing on the basis of an outer diameter of the exhaust gas purification block and the volume;
    assembling the housing, said exhaust gas purification block retaining element and the exhaust gas purification block to obtain a housing whereof a diameter is equal to the predetermined diameter, the installation density of the exhaust gas purification block retaining element being equal to the target installation density after said characteristic period of use of said exhaust gas purifying member.

2. The method according to claim 1, wherein the acquisition of the second magnitude representative of a composition of the nonfunctional component of said exhaust gas purification block retaining element comprises:
    measuring a characteristic electrical magnitude of said exhaust gas purification block retaining element; and
    determining the composition from the measured value of said electrical magnitude.

3. The method according to claim 2, wherein the composition of the nonfunctional component of said exhaust gas purification block retaining element during the installation is determined from the measured value of said electrical magnitude using calibration curves.

4. The method according to claim 2, wherein said exhaust gas purification block retaining element is a sheet, and wherein the step of measuring said characteristic electrical magnitude of said exhaust gas purification block retaining element comprises placing the sheet, along its thickness, between plates of a capacitive sensor and measuring the value of the capacity of the capacitive sensor for a predetermined voltage applied to said plates.

5. The method according to claim 1, including acquiring a third magnitude representative of a mass of the exhaust gas purification block, and determining, from the third acquired magnitude, said target installation density.

6. The method according to claim 5, wherein the determination of said target installation density comprises calculating, from the third acquired magnitude, a maximum reference force applied to the gas purification block during the use of said purifying exhaust gas member, then determining the target installation density from the maximum calculated reference force using predetermined cartography.

7. The method according to claim 1, wherein the housing, said exhaust gas purification block retaining element, and the exhaust gas purification block are assembled according to the following steps:
    arranging said exhaust gas purification block retaining element around the exhaust gas purification block;
    inserting said exhaust gas purification block retaining element and the exhaust gas purification block into the housing to obtain a provisional diameter of the housing larger than the predetermined diameter and a provisional installation density for said exhaust gas purification block retaining element; and
    restricting the housing to the predetermined diameter.

8. The method according to claim 7, wherein the insertion step is carried out by forcibly inserting said exhaust gas purification block retaining element and the exhaust gas purification block into the housing, or winding the housing around said exhaust gas purification block retaining element.

9. The method according to any claim 1, wherein the housing, said exhaust gas purification block retaining element, and the exhaust gas purification block are assembled according to the following steps:
    arranging said exhaust gas purification block retaining element around the exhaust gas purification block; and
    inserting said exhaust gas purification block retaining element and the exhaust gas purification block into the housing to directly obtain the predetermined diameter for the housing.

10. The method according to claim 1, further including an additional step comprising acquiring a fourth magnitude corresponding to an outer diameter of the exhaust gas purification block.

* * * * *